United States Patent

[11] 3,607,895

[72] Inventors Richard P. Bush
Penarth, Glamorgan;
Norman C. Lloyd, Cardiff, Glamorgan;
Christopher Pearce, Cowbridge,
Glamorgan, all of, Wales
[21] Appl. No. 734,243
[22] Filed June 4, 1968
[45] Patented Sept. 21, 1971
[73] Assignee Midland Silicones Limited
Reading, Berkshire, England
[32] Priority June 12, 1967
[33] Great Britian
[31] 27067/67

[54] BIS(ORGANOSILYL) TRIHYDROCARBYL SILYLAMINES
5 Claims, No Drawings
[52] U.S. Cl. .................................................. 260/448.2N, 260/448.2 E, 260/448.2 H
[51] Int. Cl. ...................................................... C07f 7/02

[50] Field of Search ............................................. 260/448.2 N, 448.2 E, 448.2 H

[56] References Cited
UNITED STATES PATENTS
3,253,008  5/1966  Fink ............................. 260/448.2

*Primary Examiner*—Tobias E. Levow
*Assistant Examiner*—Werten F. W. Bellamy
*Attorneys*—Robert F. Fleming, Jr. and Laurence R. Hobey ABSTRACT: Novel organosilicon compositions are prepared which contain silicon to nitrogen bonds which are attached to functional atoms and radicals. The organosilicon compounds are depictable by the formula $(XR_2Si)_2NSiR'_3$ wherein X represents H, Cl, Br, I or a hydrocarbonoxy radical and each R and R' represent an alkyl radical containing less than 6 carbon atoms, in an alkenyl radical or a monocyclic aryl radical. These compounds are useful as intermediates in the production of other silazane or siloxazane derivatives.

BIS(ORGANOSILYL) TRIHYDROCARBYL SILYLAMINES

This invention relates to novel organosilicon compounds and to processes for their preparation.

Certain compounds which are characterized by the presence therein of three silicon atoms attached to a nitrogen atom are known. This invention is concerned in particular with the provision of novel compositions of this type which contain silicon-bonded functional atoms and radicals and which are, therefore, useful as intermediates in the preparation of other classes of silazane or siloxazane compounds. The invention is also concerned with novel compositions derivable from the compounds containing functional atoms or radicals attached to silicon.

According to this invention, there are provided novel organosilicon compositions of the general formula $(XR_2Si)_2N SiR'_3$ wherein X represents H, Cl, Br, I or a hydrocarbonoxy radical and each R and each R' represent an alkyl radical containing less than 6 carbon atoms, an alkenyl radical or a monocyclic aryl radical.

The compounds of this invention in which X represents a hydrogen atom can be prepared by the reaction of an alkali metal derivative of a disilyl amino compound, the derivative having the formula $(HR_2Si)_2NZ$, wherein Z is an alkali metal atom, with a monochlorotriorganosilane of the general formula $R'_3SiCl$, R and R' being as hereinbefore defined. Preferably the alkali metal Z is lithium but other alkali metals, for example, sodium and potassium, can be used provided they do not react preferentially with the silicon-bonded hydrogen atoms under the conditions of the reaction.

The reaction can be carried out in the presence of a solvent, for example, a hydrocarbon such as toluene or xylene or, more preferably, diethyl ether or tetrahydrofuran. Although some reaction occurs at lower temperatures, the preparation is best performed at temperatures above 20° C. and most conveniently at the reflux temperature of the reaction mixture.

The alkali metal derivative reactants can be prepared by any known technique such as by the reaction of an organo lithium compound, e.g. n-butyl lithium, with the corresponding amino compound, for example, $(HR_2Si)_2NH$, in a hydrocarbon solvent such as pentane.

Compounds of this invention in which X represents a chlorine, bromine or iodine atom can be prepared directly from the analogous silicon-hydrogen containing compounds by halogenation of the silicon-bonded hydrogen atoms. The halogenation step can be performed by any suitable technique, for example, in the case of the chlorination reaction by passing chlorine through a solution of the amino compound in an organic solvent, for example, carbon tetrachloride or benzene. When the halogen is bromine or iodine, it can be added to the organosilicon compound as a solution in an organic solvent. A hydrogen halide acceptor, for example, pyridine or isoquinoline, should be present during halogenation in order to minimize the effect of the byproduced hydrogen halide on the amino-silicon compounds. The temperature at which the halogenation is carried out is not critical and temperatures from about 20° C. to about 50° C. have been found convenient.

The halogenated compounds can be converted to the hydrocarbonoxy derivatives, that is, where X is an alkoxy or aryloxy radical by reaction of the halogen atoms with the appropriate alcohol or phenol in the presence of a suitable hydrogen halide acceptor. Methods by which silicon-bonded halogen atoms can be converted to silicon-bonded alkoxy or aryloxy radicals will be well known to those skilled in the art. The hydrocarbonoxy derivatives can also be obtained as hereinafter described by reaction of a cyclodisilazane with an alcohol or a phenol.

The novel compounds of this invention represented by the general formula $(XR_2Si)_2NSiR'_3$ wherein X is chlorine, bromine or iodine can be converted to reactive cyclodisilazanes by reaction with ammonia or an organic amine $R''NH_2$, methylamine, ethylamine or aniline. The cyclodisilazanes are novel compounds having the structure

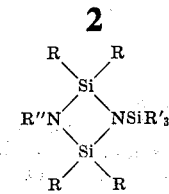

wherein R'' is derived from the ammonia or amine reactant and is hydrogen, an alkyl radical, for example, the methyl, ethyl, propyl or octadecyl radicals, an alkenyl radical such as the allyl radical or the phenyl radical, and R and R' are as hereinbefore defined. Such cyclodisilazanes and the process for their preparation are also included within the scope of this invention.

Conveniently, the preparation of these cyclodisilazanes is carried out by passing $NH_3$ or methylamine into a solution in an inert solvent of the compound of the general formula $(XR_2Si)_2SiR'_3$, X being Cl, Br or I, at or about room temperature.

When hydrolyzed, the novel cyclodisilazanes of this invention are converted to novel cyclic siloxazane compounds having the structure

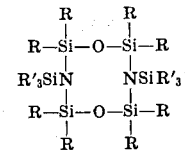

Such hydrolysis is best performed by mixing a solution of the cyclodisilazane in a water-immiscible solvent with approximately the theoretical quantity of water.

The cyclodisilazanes can also be converted to compounds of the formula $(XR_2Si)_2NSiR'_3$ wherein X is an alkoxy radical or an aryloxy radical by reaction with an alcohol or a phenol.

In the general formulas given herein each R and each R' can represent the same or different radicals and can be alkyl radicals containing less than 6 carbon atoms, for example, methyl, ethyl, propyl or butyl radicals, alkenyl radicals such as vinyl, allyl and cyclohexenyl radicals or monocyclic aryl radicals, for example, phenyl, p-tolyl or nitrophenyl radicals. The preferred compounds are those in which R and R' are both methyl radicals. When the X substituents in the general formulas are hydrocarbonoxy radicals, they are preferably selected from lower alkoxy and phenoxy radicals.

The following examples are illustrative of the invention.

EXAMPLE 1

Butyl-lithium (64 g., 1 mole) in hexane (600 ml.) was added to tetramethyldisilazane (133 g., 1 mole) in pentane (500 ml.). A vigorous reaction occurred and a white solid was precipitated. The solution was stirred for 1 hour and tetrahydrofuran (850 ml.) and chlorotrimethylsilane (108.5 g., 1 mole) was added and the mixture refluxed for 5 hours. The solution was then filtered and distilled to give bis (dimethylsilyl) trimethylsilylamine (139.5 g., 58 percent) b.p. 60°/20 mm. (Found C, 40.6; H, 11.2; N, 6.6; Si, 40.55 percent; $C_7H_{23}NSi_3$ requires C, 41.0; H, 11.2; N, 6.8; Si, 41.0 percent).

EXAMPLE 2

Gaseous chlorine was passed into a solution of bis(dimethylsilyl)trimethylsilylamine (27.5 g., 1 molar ratio) and pyridine (21.2 g., 2 molar ratios) in carbon tetrachloride (500 ml.) at 0° C. The reaction was followed by vapor phase chromatography and when complete the reaction solution was filtered and distilled to remove solvent. The product was bis(chlorodimethylsilyl)trimethylsilylamine (26 g., 70 percent) which was obtained as a low-melting solid which was not purified further. (Found: C, 30.0; H, 7.8; N, 5.0; Si, 29.75 percent; $C_7H_{21}Si_3NCl_2$ requires C, 30.65; H, 7.7; N, 5.1; Si, 30.65 percent).

EXAMPLE 3

Ammonia was passed into a solution of bis(chlorodimethylsilyl)trimethylsilylamine (26 g.) in pentane (250 ml.) the reaction being followed by means of vapor phase chromatography. Filtration of the reaction solution, evaporation of solvent and distillation gave 1-trimethylsilyl-2,2,4,4-tetramethylcyclodisilazane (11.6 g., 56 percent) b.p. 55°/10 mm. (Found: C, 39.3; H, 10.3; N, 12.6; Si, 38.5 percent; $C_7H_{22}N_2Si_3$ requires C, 38.55; H, 10.1; N, 12.85; Si, 38.55 percent). The infrared and N.M.R. spectra confirmed the cyclic structure.

EXAMPLE 4

Water (1.44 g., 1 molar ratio (was added to 1-trimethylsilyl-2,2,4,4-tetramethylcyclodisilazane (17.2 g., 1 molar ratio) in pentane (150 ml.). After 3 days standing with occasional shaking and stirring, the organic layer was separated, dried over molecular sieve, filtered, evaporated under reduced pressure and distilled to give 1,5- bis (trimethylsilyl)-2,2,4,4,6,6,8,8-octamethyl-1,5-diaza-3,7-dioxa-2,4,6,8-tetrasilacyclo-octane (9.2 g., 54 percent) b.p. 126°/5 mm. (Found: C, 39.0; H, 9.83; N, 6.04; Si, 38.0 percent; $C_{14}H_{42}N_2O_2Si_6$ requires C, 38.4; H, 9.6; N, 6.4; Si, 38.4 percent).

EXAMPLE 5

Phenol (4.1 g., 2 molar ratio) in benzene (5 ml.) was added to 1-trimethylsilyl-2,2,4,4-tetramethylcyclodisilazane (4.8 g., 1 molar ratio) and an exothermic reaction occurred. After 4 hours at room temperature, distillation gave benzene and bis(phenoxydimethylsilyl)trimethylsilylamine (7.5 g., 88 percent) b.p. 96°/2 mm., m.p. 37.5°. (Found: C, 58.5; H, 8.23; N, 3.66; Si, 21.56; $C_{19}H_{31}NO_2Si_3$ requires C, 58.6; H, 7.97; N, 3.6; Si, 21.6 percent).

That which is claimed is:

1. A novel organosilicon composition of the general formula $(XR_2Si)_2NSiR'_3$ wherein X represents H, cl, Br, I or a hydrocarbonoxy radical and each R and each R′ represent an alkyl radical containing less than 6 carbon atoms, an alkenyl radical or a monocyclic aryl radical.

2. A novel organosilicon composition as claimed in claim 1 wherein each R and each R′ are selected from alkyl radicals containing less than 6 carbon atoms and monocyclic aryl radicals, and X represents H, cl, Br, I or an alkoxy radical.

3. A novel organosilicon composition as claimed in claim 2 wherein each R and each R′ represent methyl radicals.

4. A novel organosilicon composition as claimed in claim 1 wherein the composition is a bis(dimethylsilyl)-trimethylsilylamine.

5. A novel organosilicon composition as claimed in claim 1 wherein the composition is a bis(chlorodimethylsilyl)-trimethylsilylamine.